United States Patent [19]

Okayama et al.

[11] Patent Number: 5,153,934
[45] Date of Patent: Oct. 6, 1992

[54] WAVEGUIDE-TYPE OPTICAL DEVICE

[75] Inventors: Hideaki Okayama; Toshimasa Ishida, both of Tokyo, Japan

[73] Assignee: Oki Electric Industry Co., Ltd., Tokyo, Japan

[21] Appl. No.: 791,165

[22] Filed: Nov. 13, 1991

[30] Foreign Application Priority Data

Nov. 14, 1990 [JP] Japan ............................. 2-308115

[51] Int. Cl.$^5$ .............................................. G02B 6/10
[52] U.S. Cl. ............................................ 385/40; 385/8
[58] Field of Search ......................... 385/4, 8, 9, 39–41

[56] References Cited

U.S. PATENT DOCUMENTS 4,861,126 8/1989 Dautartas et al. ..................... 385/41

OTHER PUBLICATIONS

C. M. Gee, G. D. Thurmond, H. Blauvelt, and H. W. Yen, "Minimizing dc drift in LiNbO$_3$ waveguide device," Appl. Phys. Lett. 47 (3) Aug. 1, 1985 p. 211.

Primary Examiner—John D. Lee
Assistant Examiner—John Ngo
Attorney, Agent, or Firm—Edward D. Manzo

[57] ABSTRACT

A waveguide-type optical device of the invention has a dielectric substrate, wave-guiding paths formed in the dielectric substrate, and electrodes for forming an operation-controlling electric field for the wave-guiding paths. A carrier capture layer is provided in a region into which carriers are injected from at least one of the electrodes.

25 Claims, 7 Drawing Sheets

WAVEGUIDE-TYPE OPTICAL DEVICE

BACKGROUND OF THE INVENTION

1) Field of the Invention

This invention relates to a waveguide-type optical device, for example, an optical switch.

2) Description of the Related Art

Waveguide-type optical devices with metal electrodes provided on a buffer layer have been proposed to date. These conventional waveguide-type optical devices will hereinafter be described with reference to some of the accompanying drawings.

FIG. 12 is a cross-sectional view showing one example of the conventional waveguide-type optical devices. The waveguide-type optical device depicted in this drawing is a typical optical switch, which is equipped with a substrate 10, wave-guiding paths 12,14 formed in the substrate 10, a buffer layer 16 provided on a surface 10a of the substrate 10, said surface 10a being on the side of the wave-guiding paths 12,14, and electrodes 18,20 provided on the buffer layer 16.

In this typical example, the substrate 10 is a Z-cut of a $LiNbO_3$ substrate and the wave-guiding paths 12,14 have been formed by diffusing Ti into the substrate 10. The buffer layer 16 is an $SiO_2$ layer. The electrodes 18,20 are provided on the buffer layer 16 at regions right above the wave-guiding paths 12,14, respectively.

FIG. 13 is a cross-sectional view illustrating another example of the conventional waveguide-type optical devices, in which elements of structure similar to their corresponding elements in the above-described conventional example are indicated by like reference numerals.

In this example, the substrate 10 is an X-cut of a $LiNbO_3$ substrate. The buffer layer is divided into three buffer layers 22,24,26 to expose the wave-guiding paths 12,14. Electrodes 28,30,32 are provided above the respective buffer layers 22,24,26.

The two waveguide-type optical devices described above have the advantage that the propagation loss and scattering of light by metal electrodes can be prevented because the electrodes are provided on the buffer layer.

As a further example of such optical switches, an optical switch with an indium tin oxide (ITO) layer as a buffer layer has been proposed, for example, in Applied Physics Letters, 47, 211 (Aug. 1, 1985).

In each of the conventional waveguide-type optical devices shown in FIGS. 12 and 13, the resistance of the buffer layer is high so that, when a voltage is applied across the electrodes to control the operation, a space charge limiting current flows into the substrate from the positive electrode and carriers are also injected into the buffer layer, especially into a part of the buffer layer, said part being located adjacent the negative electrode. As a result, space charges are produced by the injected carriers and are superimposed on an electric field developed via the electrodes for operational control. This has led the problem that the drive voltage required for the waveguide-type optical device varies.

FIG. 14 diagrammatically illustrates variations of the drive voltage. This diagram shows the results of an experiment conducted on the waveguide-type optical device shown in FIG. 12. In FIG. 14, the drive voltage is plotted along the ordinate while the time elapsed after the initiation of the application of the voltage (i.e., voltage application time) is plotted along the abscissa.

As is depicted in FIG. 14, the voltage (i.e., drive voltage)—which should be applied across the electrode to make the waveguide-type optical device output light with predetermined output power from a desired output port thereof—drops with the time elapsed after the initiation of the application of the drive voltage and, beyond a certain time point, remains at substantially a constant value. The drop of the drive voltage is about 10% of the drive voltage at the time of the initiation of the application of the voltage.

When a waveguide-type optical device is put into practical use, it is necessary to maintain constant a voltage applied across electrodes of the waveguide-type optical device so that control can be simplified. However, the value of a voltage required to obtain predetermined output power (i.e., drive voltage) eventually drops in a conventional waveguide-type optical devices as described above. This has led to the problem that light cannot be outputted with desired output power from a predetermined output port if the voltage applied across the electrodes is maintained constant.

To avoid the occurrence of such problems, an ITO layer is provided as the buffer layer in the optical switch disclosed in the literature referred to above. The optical switch is, however, accompanied by another problem that the switching speed becomes slow when a high-frequency signal is inputted.

SUMMARY OF THE INVENTION

An object of the present invention is to provide a waveguide-type optical device with a layer for capturing injected carriers to overcome the above-described problems of the conventional waveguide-type optical devices.

To attain the above object, the present invention provides a waveguide-type optical device equipped with a dielectric substrate, wave-guiding paths formed in the dielectric substrate, and electrodes for forming an operation-controlling electric field for the wave-guiding paths. A carrier capture layer having traps is provided in a region into which carriers are injected from at least one of the electrodes.

Owing to the construction described above, carriers can be captured by the carrier capture layer. Since injected carriers are distributed primarily in a surface layer of the carrier capture layer, it is possible to reduce the degree to which an electric field produced by captured carriers may be superimposed on an electric field developed for operational control. The degree of such superimposition can be controlled by changing, for example, the thickness of the carrier capture layer or the density of traps. Variations of the drive voltage for the waveguide-type optical device can be reduced further as the degree of superimposition on an electric field to be developed for operational control is decreased.

DETAILED DESCRIPTION OF THE PREFERRED EMBODIMENTS

Figure 1:
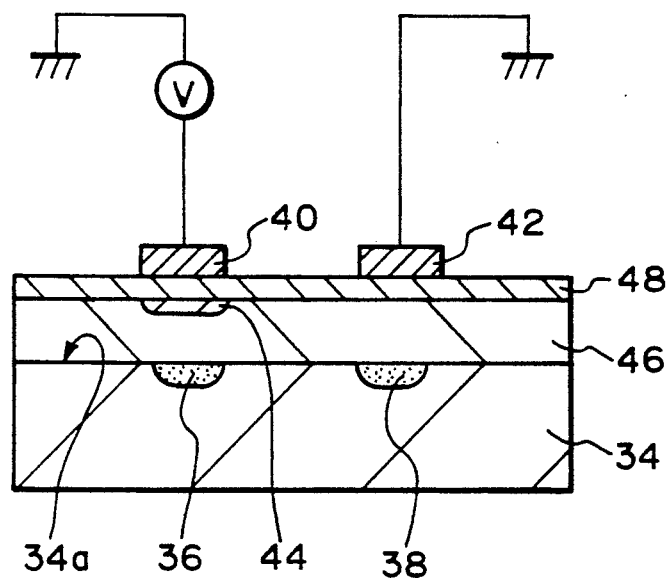
FIG. 1 is a simplified schematic cross-section of a waveguide-type optical device according to a first embodiment of the present invention.

Referring first to FIG. 1, the waveguide-type optical device according to the first embodiment of the present invention will be described. The waveguide-type optical device is equipped with wave-guiding paths 36,38, which are formed in a dielectric substrate 34, and electrodes 40,42 for producing an operation-controlling electric field relative to the wave-guiding paths 36,38. Further, a carrier capture layer 44 having traps is provided in a region into which carriers are injected from the electrode 40.

Described more specifically, a Z-cut of a LiNbO3 substrate is used as the substrate 34 and Ti is diffused in one side of the substrate 34 to form the wave-guiding paths 36,38. An SiO2 layer is provided over the entire area of a substrate surface 34a which is located on side of the wave-guiding paths. A dopant P is added to the SiO2 layer. It will be understood that as used herein, "P" is the chemical symbol for the element phosphorus. The dopant-added region of the SiO2 layer serves as the carrier capture layer 44, while the remaining region of the SiO2 layer acts as a buffer layer 46. The buffer layer 46 is located between the carrier capture layer 44 and the wave-guiding path 36.

A semiconducting film 48 made of Si or the like is then formed covering the entire areas of the carrier capture layer 4 and the buffer layer 46. The semiconducting film 48 is provided to prevent or reduce variations of the drive voltage caused by the pyroelectric effect.

If charges are produced on the substrate surface 34a by the pyroelectric effect, charges of the opposite polarity to the former charges are developed on the surface of the semiconducting film 48 so that a uniform electric field is formed by these charges on the substrate surface 34a and semiconducting film 48. This uniform electric field is therefore superimposed on an electric field produced via the electrodes for operational control, thereby making it possible to prevent variations of the drive voltage caused by the pyroelectric effect.

Further, the electrodes 40,42 are provided as negative and positive electrodes on the semiconducting film 48 at positions right above the wave-guiding paths 36,38, respectively. In this construction, it is electrons to be injected via the electrode 40 that can be injected most easily into the buffer layer 46 made of SiO2. Variations of the drive voltage, therefore, can be effectively prevented when the carrier capture layer 44 is provided for the electrode 40 alone.

The carrier capture layer 44 is then provided in the proximity of the electrode 40. Here, the carrier capture layer 44 is arranged so that, when viewed in plan, the carrier capture layer 44 has a size equal to or greater than the region of arrangement of the electrode 40 and overlapping exists between the carrier capture layer 44 and the electrode 40.

Figure 2:
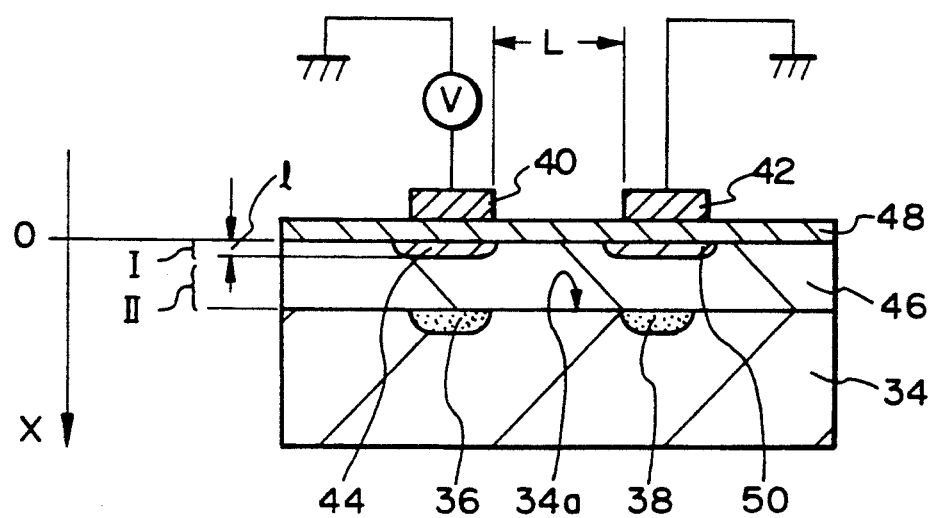
FIG. 2 is a simplified schematic cross-section of a modification of the first embodiment.

The modification of the first embodiment will next be described with reference to FIG. 2, in which elements of structure corresponding to like elements of structure in the first embodiment are designated by like reference numerals. A description will hereinafter be made of matters different from the first embodiment, and detailed description of matters similar to the first embodiment are omitted herein.

In this modification, a carrier capture layer 50 is additionally provided for the positive electrode 42 to also capture holes injected as carriers. A buffer layer 46 is interposed between the carrier capture layer 50 and the wave-guiding path 38.

Another modification of the first embodiment will next be described. The carrier capture layer 44 was formed by adding P in the SiO2 layer in the first embodiment, Sb, As, Zn, Sn or the like may also be added as a dopant. As a further alternative, the carrier capture layer 44 may also be a region formed by exposing the SiO2 layer to an electron beam or γ rays to form lattice defects therein or a region formed by adding H2O into the SiO2 layer. The carrier capture layer 44 can be formed from SiO2 or can be in the form of a dopant-added semiconductor layer or a dielectric layer. The addition of the dopant can be effected by ion implantation, diffusion or any other desired suitable method.

In the first embodiment, the semiconducting film 48 was provided to cover the entire surfaces of the carrier capture layer 44 and buffer layer 46 and the electrodes 40,42 were provided on the semiconducting film 48. It is, however, sufficient as long as the semiconducting film 48 is provided at least in contact with the electrodes 40,42 and between the electrodes 40 and 42. The semiconducting film 48 may therefore be provided only between the electrodes 40 and 42, or the electrodes 40,42 may be provided on the carrier capture layer 44 and the buffer layer 46, respectively, and the semiconducting film 48 may then be provided over the electrodes 40,42. By providing the electrode 40 in contact with the carrier capture layer 44, it is possible to more efficiently capture electrons and release the thus-captured electrons via the positive electrode to an external electric circuit.

Figure 3:
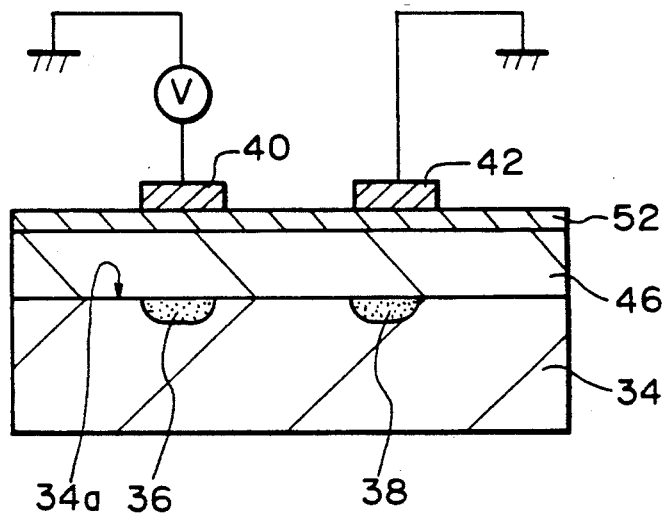
FIG. 3 is a simplified schematic cross-section of a waveguide-type optical device according to a second embodiment of the present invention.

The waveguide-type optical device according to the second embodiment of the present invention will hereinafter be described with reference to FIG. 3, in which elements of structure corresponding to like elements of structure in the first embodiment are designated by like reference numerals. A description will hereinafter be made of matters different from the first embodiment, and detailed description of matters similar to the first embodiment are omitted herein.

In the second embodiment, an annealed Si layer or an annealed cermet layer, e.g., a Cr-SiO cermet layer is provided as a carrier capture layer 52. A buffer layer 46 and the carrier capture layer 52 are formed successively on the substrate surface 34a. The carrier capture layer 52 is provided to cover the entire surface of the buffer layer 46, and the electrodes 40,42 are provided on the carrier capture layer 52 so that the electrodes 40,42 are in direct contact with the carrier capture 52. Although the semiconducting film 48 is not provided, the annealed Si layer or annealed Cr-SiO cermet layer also has the function of the semiconducting film 48. The formation of the Si layer or Cr-SiO cermet layer can be conducted using evaporation, sputtering or any other desired appropriate film-forming method.

The second embodiment can be modified into such a structure that the carrier capture layer 52 is left over at a portion right underneath the electrode 40 and/or at a portion right below the electrode 42 but is removed at the remaining portion.

Figure 4:
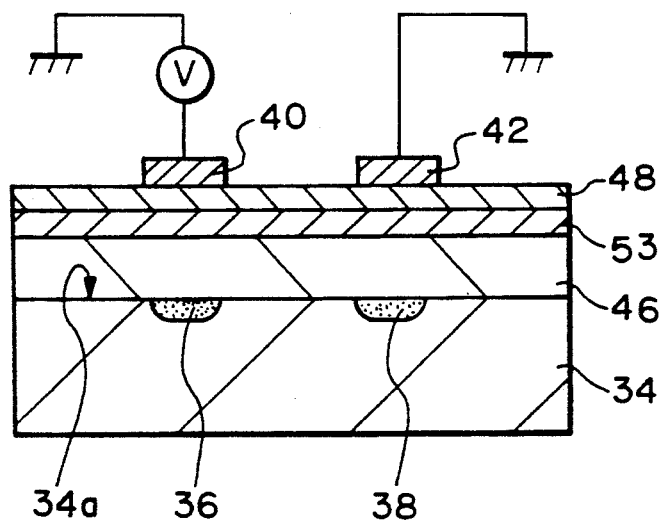
FIG. 4 is a simplified schematic cross-section of a waveguide-type optical device according to a third embodiment of the present invention.

The waveguide-type optical device according to the third embodiment of the present invention will hereinafter be described with reference to FIG. 4, in which elements of structure corresponding to like elements of structure in the first embodiment are designated by like reference numerals. A description will hereinafter be made of matters different from the first embodiment, and detailed description of matters similar to the first embodiment are omitted herein.

In the third embodiment, a P-doped SiO₂ layer is provided as a carrier capture layer 53. A buffer layer 46, the carrier capture layer 53 and a semiconducting film 48 are successively formed on the substrate surface 34a. To provide the carrier capture layer 53, a mixture of P and SiO₂ is applied on the buffer layer 46 by spin-coating and is then baked to form an SiO₂ layer with P added or mixed therein. As an alternative, a SiO₂ layer added or mixed with P can also be formed, for example, by simultaneously depositing P and SiO₂ while using P and SiO₂ as deposition sources, respectively, or by using P and SiO₂ as targets and simultaneously coating these P and SiO₂ by sputtering.

The third embodiment can be modified to have a structure such that the carrier capture layer 53 is left over at portions right underneath the electrodes but the remaining portion is removed.

Figure 5:
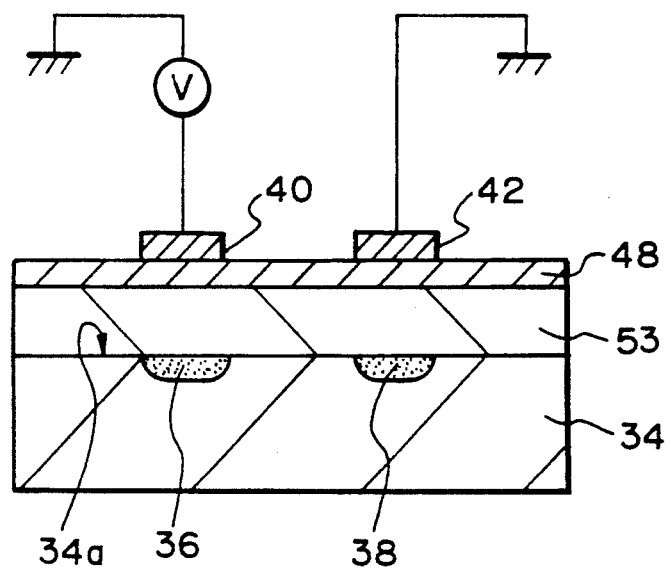
FIG. 5 is a simplified schematic cross-section of a modification of the third embodiment.

The modification of the third embodiment of this invention will next be described with reference to FIG. 5. In this modification, the carrier capture layer 53, the semiconducting film 48 and the electrodes 40,42 are successively provided but the buffer layer 46 is not provided. The other matters are similar to the third embodiment described above.

Figure 6:
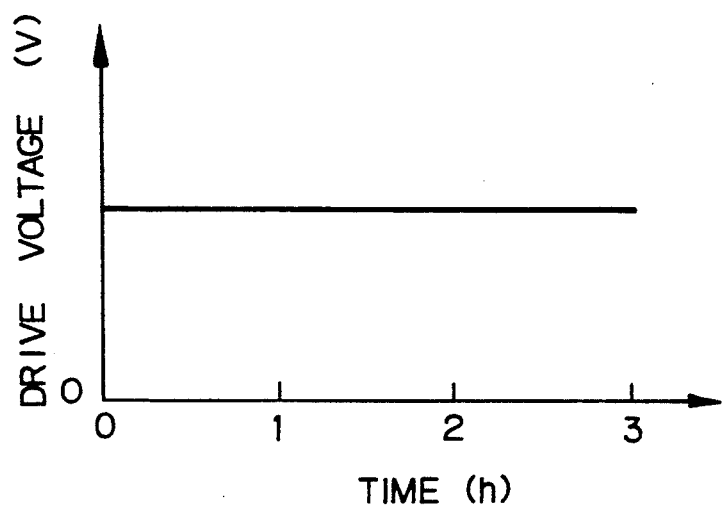
FIG. 6 is a diagrammatic representation of the drive voltage for the waveguide-type optical device of the second embodiment.

Variations of the drive voltage for the second embodiment are depicted in FIG. 6, in which the drive voltage (unit: V) is plotted along the axis of ordinates while the time elapsed after the initiation of the application of the voltage [i.e., voltage application time (unit: hours)] is plotted along the axis of abscissas.

As is also understood from FIG. 6, it has been empirically confirmed that variations of the drive voltage can be eliminated substantially, In the experiment, it was possible to reduce, to 0.1 V/hour or lower, variations (DC drift) of the drive voltage caused by carrier injection. This seems to be attributed to the capture of carriers introduced from the electrode so that the carriers would not be allowed to penetrate to the side of the wave-guiding paths of the buffer layer 46. Similarly to the drive voltage shown in FIG. 6, it was also empirically confirmed that the drive voltage for the third embodiment was substantially free of variations.

The waveguide-type optical device according to the fourth embodiment of this invention will next be described with reference to FIG. 7, in which elements of structure corresponding to like elements of structure in the modification of the first embodiment are designated by like reference numerals. A description will hereinafter be made of matters different from the modification of the first embodiment, and detailed description of matters similar to the modification of the first embodiment are omitted herein.

In the fourth embodiment, a carrier capture layer 44 is provided continuously from the semiconducting film 48 to wave-guiding path 36 so that the carrier capture layer 44 is in contact with the wave-guiding path 36. The buffer layer 46 is not provided between the carrier capture layer 44 and the wave-guiding path 36. Likewise, a carrier capture layer 50 is provided continuously from the semiconducting film 48 to the wave-guiding path 38, whereby the carrier capture layer 50 is in contact with the wave-guiding path 38 and the buffer layer 46 is not provided between the carrier capture layer 50 and the wave-guiding path 38. As a result, the buffer layer 46 has been divided into three portions 46a,46b,46c. The formation of the carrier capture layers 44,45 is conducted, for example, by evaporation or sputtering.

The fourth embodiment may be modified to have a structure such that the carrier capture layer 50 is omitted by replacing it with the buffer layer.

Figure 8:
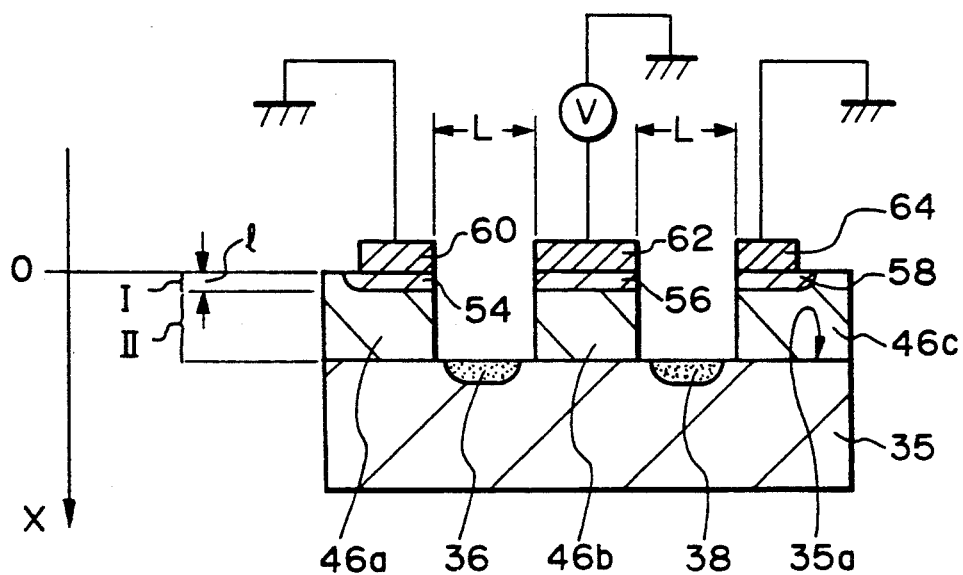
FIG. 8 is a simplified schematic cross-section of a waveguide-type optical device according to a fifth embodiment of the present invention.

The waveguide-type optical device according to the fifth embodiment of this invention will next be described with reference to FIG. 8, in which elements of structure corresponding to like elements of structure in the modification of the first embodiment are designated by like reference numerals. A description will hereinafter be made of matters different from the modification of the first embodiment, and detailed description of matters similar to the modification of the first embodiment are omitted herein.

In the fifth embodiment, an X-cut of an LiNbO₃ substrate is used as a substrate 35. A buffer layer in a form divided into three buffer layers 46a,46b,46c is provided on a substrate surface 35a of the substrate 35. These buffer layers 46a,46b,46c are arranged spaced apart from one another, and wave-guiding paths 36,38 are exposed between the adjacent buffer layers 46a and 46b and between the adjacent buffer layers 46b and 46c, respectively. Further, carrier capture layers 54,56,58 are provided on the buffer layers 46a,46b,46c, respectively. In addition, electrodes 60,62,64 are provided on these capture layers 54,56,58, respectively. The semiconductor layer 48 is not provided. The formation of the carrier capture layers 54,56,58 is effected, for example, by ion implantation or diffusion.

To form the buffer layers and carrier capture layers, an SiO₂ layer for the formation of these buffer layers and carrier capture layers is stacked on the substrate surface 35a of the substrate 35, said substrate surface 35a being on the side of the wave-guiding paths 36,38. A dopant is added to regions in a surface portion of the SiO₂ layer, which regions correspond to the carrier capture layers 54,56,58, respectively. This SiO₂ layer is then divided by etching into three portions so that the wave-guiding paths 36,38 are exposed. Doped regions of the three divided portions of the SiO₂ layer form the carrier capture layers 54,56,58, respectively, and the remaining regions become the buffer layers 46a,46b,46c, respectively.

The fifth embodiment may be modified to have a structure such that the carrier capture layers 54,58 are omitted by replacing them by the buffer layer.

The waveguide-type optical device according to the sixth embodiment of this invention will next be described with reference to FIG. 9, in which elements of structure corresponding to like elements of structure in the fifth embodiment are designated by like reference numerals. A description will hereinafter be made of matters different from the fifth embodiment, and detailed description of matters similar to the fifth embodiment are omitted herein.

In the sixth embodiment, only a carrier capture layer 54 is provided between the electrode 60 and the substrate 35 and the buffer layer 46a is not provided. Between the electrode 62 and the substrate 35, only a carrier capture layer 56 is provided and the buffer layer 46b is omitted. Further, between the electrode 64 and the substrate 35, only a carrier capture layer 58 is provided and the buffer layer 46c is omitted. To form the carrier capture layers, a P-doped SiO₂ layer is stacked on the surface 35a of the substrate 35, said substrate surface 35a being located on the side of the wave-guiding paths 36,38, by evaporation or sputtering, for example. The P-doped SiO₂ layer is then divided by etching into three portions so that the wave-guiding paths 36,38 are exposed. The three portions formed by dividing the P-doped SiO₂ layer serve as the carrier capture layers 54,56,58, respectively.

The sixth embodiment may be modified to have a structure such that the carrier capture layers 54,58 are omitted by replacing them by the buffer layer.

Figure 10:
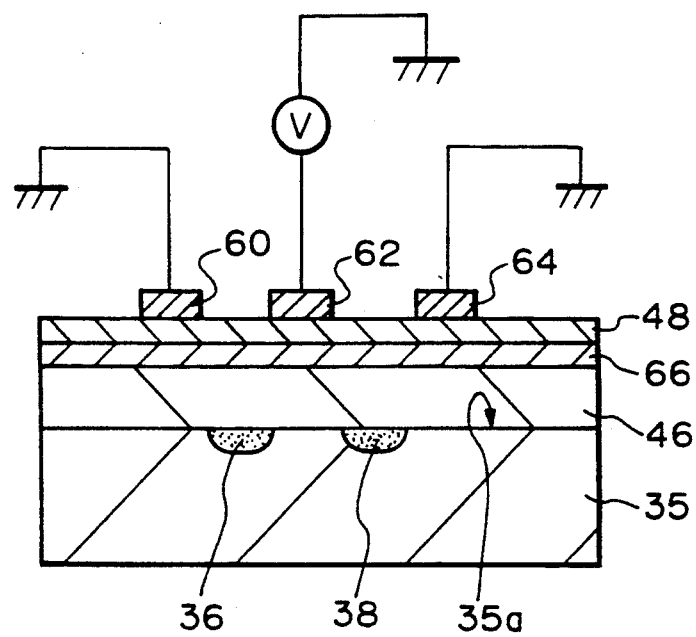
FIG. 10 is a simplified schematic cross-section of a waveguide-type optical device according to a seventh embodiment of the present invention.

The waveguide-type optical device according to the seventh embodiment of this invention will next be described with reference to FIG. 10, in which elements of structure corresponding to like elements of structure in the fifth embodiment are designated by like reference numerals. A description will hereinafter be made of matters different from the fifth embodiment, and detailed description of matters similar to the fifth embodiment are omitted herein.

In the seventh embodiment, on the substrate surface 35a, a buffer layer 46 made of SiO₂, a carrier capture layer 66 made of P-doped SiO₂, a semiconducting film 48 made of Si or the like, and electrodes 60,62,64 are successively provided. The buffer layer 46, carrier capture layer 66 and semiconducting film 48 extend all over the substrate surface 35a. The formation of the carrier capture layer 66 is accomplished, for example, by evaporation or sputtering. When viewed in plan, the electrode 62 is arranged between the wave-guiding paths 36 and 38, the electrode 60 is disposed on one side of the wave-guiding path 36, said side being opposite to the electrode 62, and the electrode 64 is placed on one side of the wave-guiding path 38, said side being opposite to the electrode 62.

In each of the first to seventh embodiments described above, the electrodes and the carrier capture layer or layers are electrically contacted to each other either directly or via the semiconducting film. By doing so, when the application of a drive voltage is stopped subsequent to its application across the electrodes, injected carriers can be promptly released to an external circuit.

It is therefore possible to prevent the device from malfunction which would otherwise take place by an electric field developed by injected carriers still remaining in the device after the application of a drive voltage has been stopped.

A discussion will next be made on possible reasons for the successful prevention of variations of the drive voltage by such a carrier capture layer. Although this has not been fully elucidated, highly probable theories will hereinafter be described.

First Theory

When the concentration of carriers injected from the electrode (hereinafter simply referred to as "injected carriers") becomes higher than that of thermally stimulated carriers present in the substrate, a space charge limiting current flows to produce space charges which may cause a variation of the drive voltage. Assuming that these space charges occur upon application of a voltage of a value V across the electrodes, the voltage value V in the case of shallow traps (i.e., traps whose energy levels are close to the conduction band) can be expressed by the following formula (1):

$$V = \frac{e \cdot n_o \cdot L^2}{K \cdot \epsilon} \quad (1)$$

where e: elementary electric charge, $n_o$: concentration of thermally stimulated carriers in the substrate, and L: inter-electrode distance. Further, $K = n/n_t$ in which n means the sum of the concentration of injected carriers and the concentration of the thermally stimulated carriers and $n_t$ denotes the concentration of injected carriers captured by the trap.

K becomes smaller as $n_t$ becomes greater so that, as is understood from the formula (1), the voltage value V increases with $n_t$ in the case of shallow traps.

On the other hand, the voltage value V in the case of deep traps (i.e., traps whose energy levels are closed to the valence band) can be expressed by the following formula (2):

$$V = \frac{e \cdot nt \cdot L2}{\epsilon} \quad (2)$$

As is envisaged from the formula (2), the voltage value V also becomes greater with $n_t$ in the case of deep traps.

According to the first theory, the voltage value V becomes greater if the density of traps contained per unit volume of the carrier capture layer (hereinafter called the "trap density") is made greater. As a result, it is possible to prevent variations of the drive voltage caused by injected carriers. In addition, according to this theory, there is no correlation between the prevention of variations of the drive voltage and the thickness of the carrier capture layer.

As a reference literature relating this theory, refer to "Current Injection in Solid", written jointly by M. A. Lampert and P. Marck, Academic Press (1970).

Second Theory

Imagine an X-axis perpendicular to a substrate surface. The position of the edge of a carrier capture layer, said edge being on a side closer to the electrode in the direction extending along the X-axis, is assumed to be an origin O (see FIG. 2 and FIGS. 7-9). The concentration distribution n(x) of injected carriers at a position apart by the distance x from the origin O along the X-axis will now be discussed.

Figure 7:
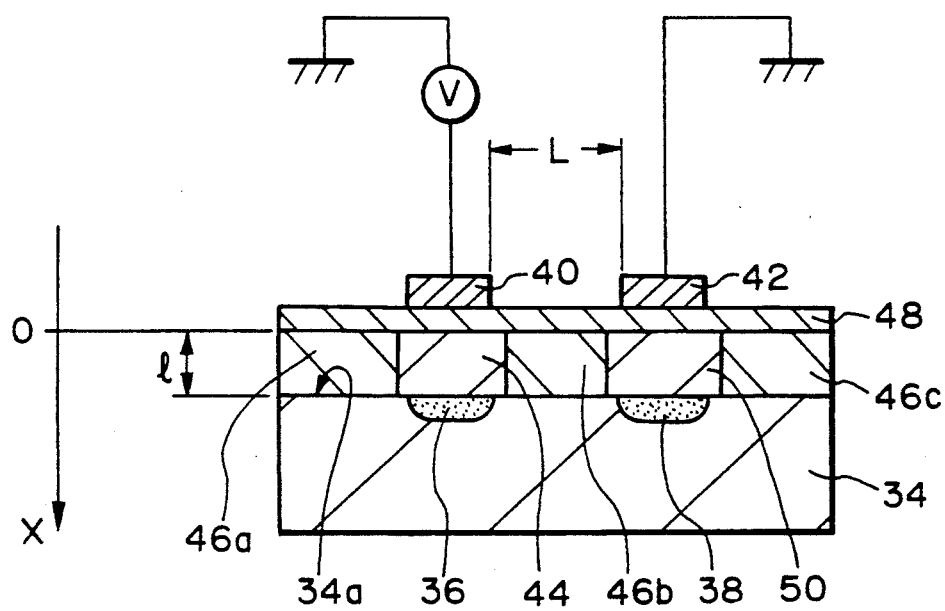
FIG. 7 is a simplified schematic cross-section of a waveguide-type optical device according to a fourth embodiment of the present invention.
Figure 9:
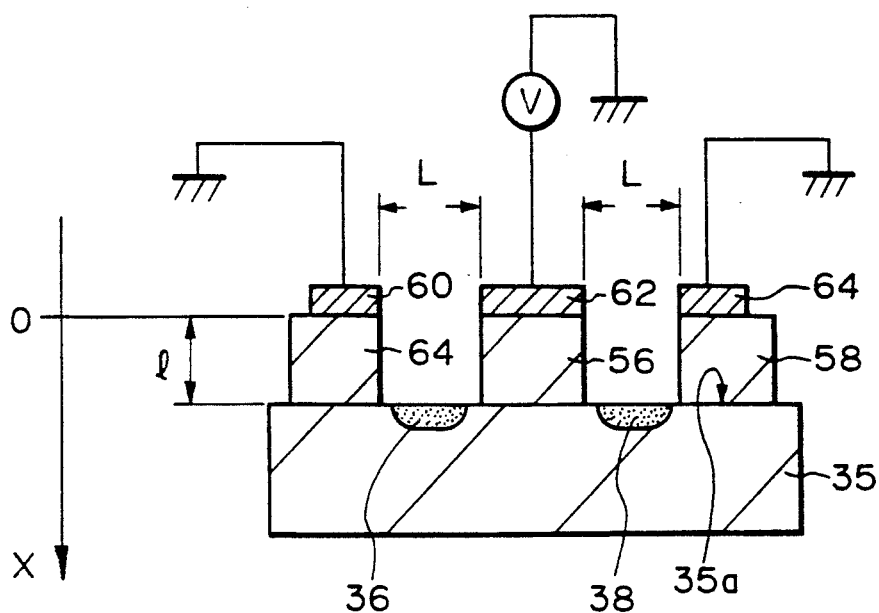
FIG. 9 is a simplified schematic cross-section of a waveguide-type optical device according to a sixth embodiment of the present invention.

The concentration n(x) in each of the fourth embodiment shown in FIG. 7 and the sixth embodiment depicted in FIG. 9 can be expressed by the following formula (3):

$$w = -u - l_n(1-u) \qquad (3)$$

where $$u = \frac{n_o}{n(x)},$$

$$w = \frac{e^2 \cdot n_o \cdot \mu \cdot x}{K \cdot \epsilon \cdot J},$$

$n_o$: concentration of free electrons in the substrate,
$\mu$: mobility of electrons, and
J: magnitude of a current flowing across the positive and negative electrodes.

When the density of traps in the carrier capture layer is made higher to make K smaller, the concentration n(x) of injected carriers, as is understood from the formula (3), becomes high in a region extremely close to the origin but becomes very low in the other ions. Since the intensity of the electric field produced by electrons provided by injected carriers becomes high in a region where the concentration n(x) is high, the region where the electric field produced by carriers becomes high is a thin region located extremely close to the electrode.

By using, as described above, the thin region extremely close to the electrode as the region where a strong electric field is formed by carriers, it is possible to make an electric field—which is formed by the superimposition of the electric field caused by carriers and the electric field produced by the voltage applied across the electrodes—approximately equal to the electric field induced by the voltage applied across the electrodes alone. As a result, it seems to be possible to substantially eliminate variations of the drive voltage substantially.

Next, the concentration n(x) in each of the modification of the first embodiment, said modification being shown in FIG. 2, and the fifth embodiments depicted in FIG. 8 will be discussed. In this case, the density distribution n(x) in a region I where more carriers are trapped and the density distribution n(x) in a region II where less carriers are trapped will be discussed separately (as to the regions I and II, refer to FIGS. 2 and 8).

Assuming that $n_o$ is very small, the concentration distribution n(x) in the region I can be expressed by the following formula (4):

$$n(x) = \frac{1}{e} \cdot \sqrt{\frac{J \cdot \epsilon}{2 \cdot \mu}} \cdot \left(\frac{x}{K}\right)^{-1/2} \qquad (4)$$

Assuming further that $n_o$ is very small, the concentration distribution n(x) in the region II can be expressed by the following formula (5):

$$n(x) = \frac{1}{e} \cdot \sqrt{\frac{J \cdot \epsilon}{2 \cdot \mu}} \cdot \left\{x + l \cdot \left(\frac{1}{K} - 1\right)\right\}^{-1/2} \qquad (5)$$

When the density of traps in the carrier capture layer is raised to make K smaller, the concentration n(x) of injected carriers becomes high in a thin region extremely close to the origin but becomes very low in the other regions as is understood from the formulas (4) and (5). Since the intensity of the electric field produced by charges—which have in turn been induced by injected carriers (which may hereinafter be called the "electric field produced by carriers")—becomes greater in a region having a high concentration n(x), the region where a strong electric field is produced by carriers is the thin region extremely close to the electrode.

By forming a region, where a strong electric field is produced by carriers, as a thin region extremely close to an electrode as described above, it appears possible to make a superimposed electric field of the electric field produced by carriers and an electric field developed via the electrode approximately equal to the electric field developed by the electrode alone. This seems to make the drive voltage substantially free from variations.

According to the second theory, it is therefore possible to prevent variations of the drive voltage, which would otherwise be induced, by increasing the trap density.

Further, the region permitting distribution of injected carriers therein is the region which is extremely close to the electrode and is also thin. The distribution of carriers therefore reaches a steady state in a very short time after the initiation of the injection of the carriers and, once the steady state has been attained, the drive voltage is stabilized at substantially the same level. No problem therefore arises in practice.

Third Theory

In each of the embodiments of FIGS. 2 and 7-9, the intensity E(x) of an electric field produced by superimposing an electric field induced via the electrode and an electric field produced by injected carriers (i.e., an electric field produced outside the carrier capture layer) can be expressed by the following formula (6):

When $\frac{x}{L} > \frac{l}{L}$, $$E(x) = \frac{V_o}{L} \cdot \frac{3}{2} \cdot \left\{\frac{x}{L} + \frac{l}{L} \cdot \left(\frac{1}{K} - 1\right)\right\}^{1/2} \div \qquad (6)$$

$$\left[(K-1) \cdot \left(\frac{l}{L \cdot K}\right)^{3/2} + \left\{1 + \frac{l}{L} \cdot \left(\frac{1}{K} - 1\right)\right\}^{3/2}\right]$$

where
$V_o$: magnitude of a voltage applied across the electrodes, and
l: length of the carrier capture layer in the direction along the X-axis (see FIGS. 2 and 7-9).

When the following formulas (7)-(8) are satisfied in the formula (6), $E(x) \approx V_o/L$ can be derived.

$$\frac{x}{L} - \frac{l}{L} < 1 << \frac{l}{L} \cdot \frac{1}{K} \qquad (7)$$

$$\frac{l}{L} << 1 \qquad (8)$$

As an electric field represented by $E(x) \approx V_o/L$ is approximately equal to an electric field formed via electrodes without injection of carriers, it is considered to be possible to prevent variations of the drive voltage by fabricating a waveguide-type optical device so that the formulas (7) and (8) are satisfied.

According to the third theory, it is hence possible to prevent variations of the drive voltage by making the trap density high and/or the thickness of the carrier capture layer (the length l referred to above) small. In the third theory, there is correlation between the prevention of variations of the drive voltage and the thickness of the carrier capture layer.

The successful prevention of variations of the drive voltage may be elucidated as follows:

1) Since the current is continuous at the boundary between the buffer layer and the carrier capture layer, the current flowing through the buffer layer is equal to that flowing through the carrier capture layer. The carrier capture layer traps or captures carriers so that only a part of charges (carriers) contributing to space charges contributes to the current in the carrier capture layer, in other words, to the conduction of electricity through the carrier capture layer. Namely, only untrapped carriers are allowed to move through the carrier capture layer so that the current flowing through the carrier capture layer is small. The current flowing through the buffer layer is hence small. This means that the quantity of carriers to be injected into the buffer layer is only a little. Only a little charges are therefore present in the buffer layer, whereby these charges are distributed almost evenly and a substantially uniform electric field is produced in the buffer layer.

2) When the thickness of the carrier capture layer is significantly small, the potential of the carrier capture layer, said potential contributing to the overall potential (i.e., voltage), becomes lower.

When the waveguide-type device is fabricated to satisfy the formulas (7) and (8) described above, the relationship between the electric field and the voltage in the buffer layer remains, as is understood from the above reasons 1) and 2), substantially same as that observed without injection of carriers into the buffer even when carriers are injected into the buffer layer. As a result, DC drift by the buffer layer can be eliminated so that variations of the drive voltage can be prevented.

When $$0 < \frac{x}{L} < \frac{l}{L},$$

the intensity $E(x)$ of the superimposed electric field of the electric field produced via the electrodes and that induced by the carriers (i.e., the electric field developed in the carrier capture layer) can be expressed by the following formula (9):

$$E(x) = \frac{V_o}{L} \cdot \frac{3}{2} \cdot \left(\frac{x}{L \cdot K}\right)^{1/2} \div \left[(K-1)\cdot\left(\frac{l}{L \cdot K}\right)^{3/2} + \left(1 + \frac{l}{L}\cdot\left(\frac{1}{K}-1\right)\right)^{3/2}\right] \quad (9)$$

Figure 11:
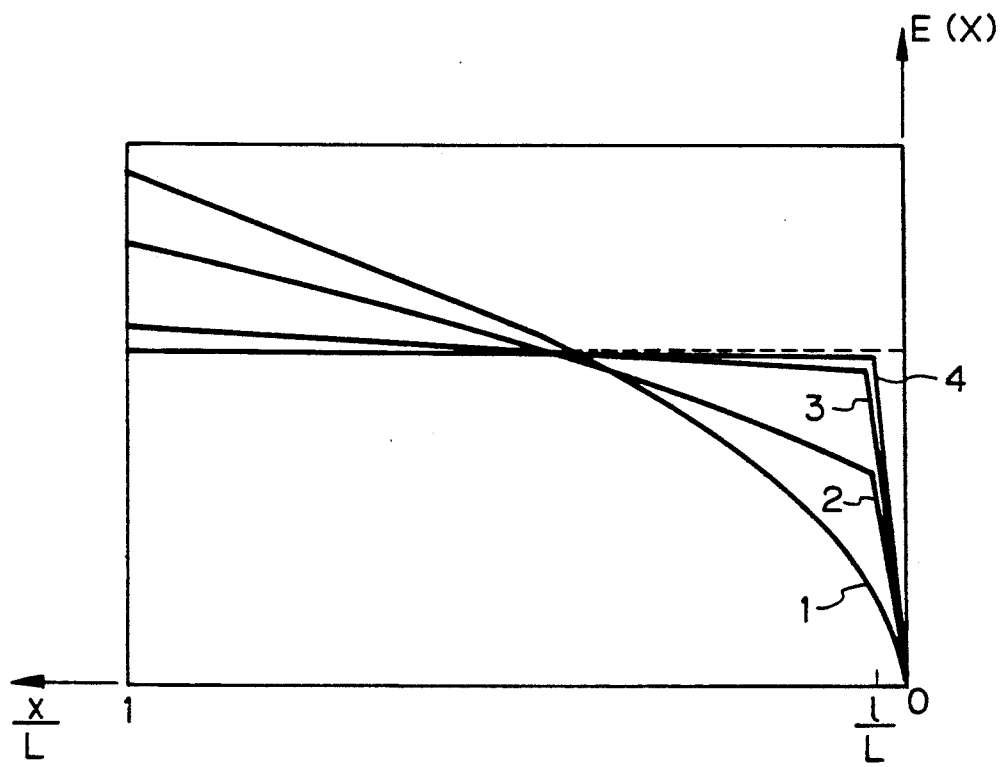
FIG. 11 is a diagrammatic representation showing variations of the intensity E(x) of an electric field.
Figure 12:
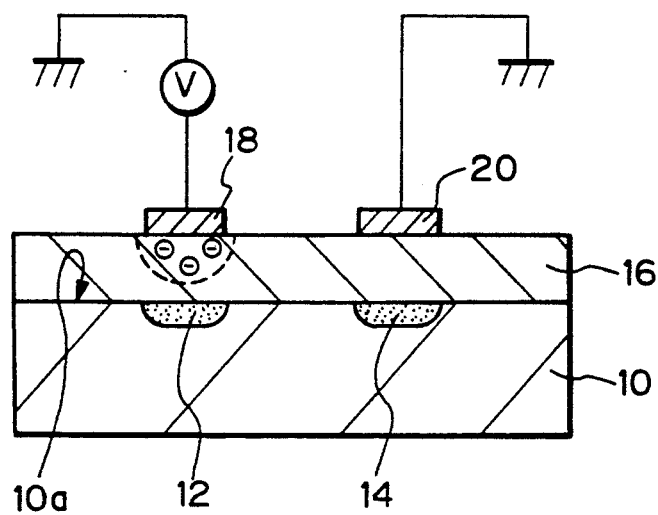
FIG. 12 is a simplified schematic cross-section of a conventional waveguide-type optical device.
Figure 13:
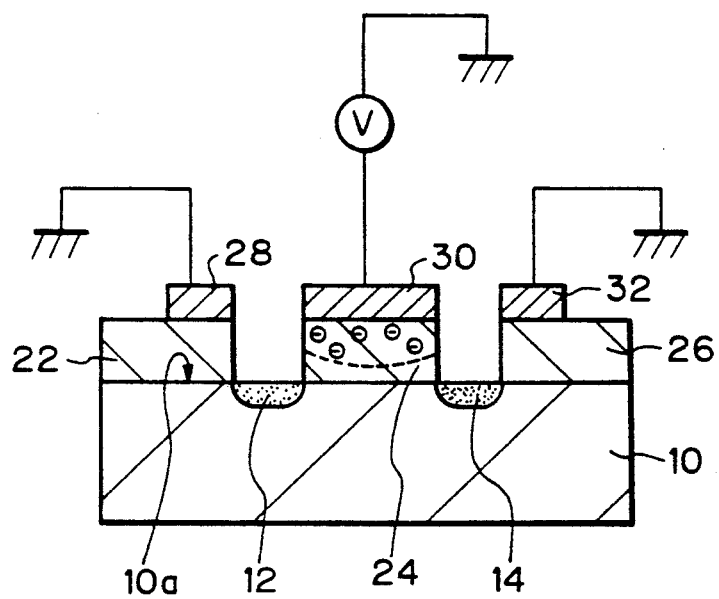
FIG. 13 is a simplified schematic cross-section of another conventional waveguide-type optical device.
Figure 14:
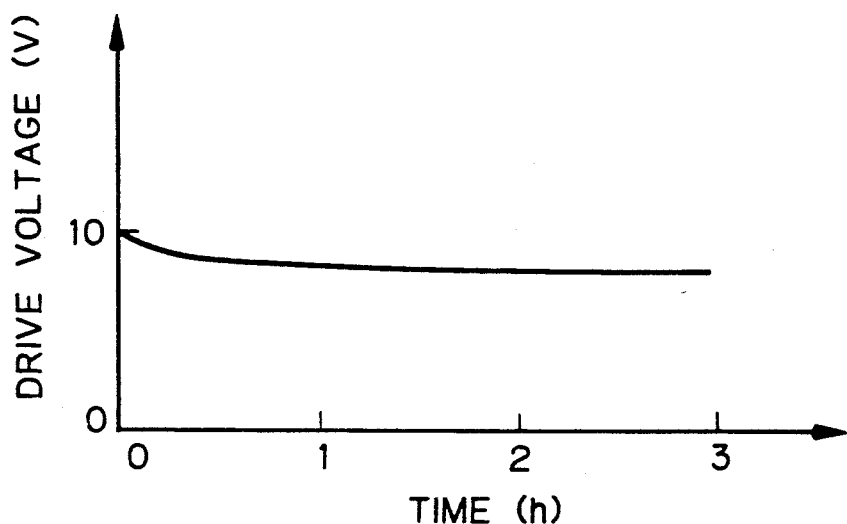
FIG. 14 is a diagrammatic representation of the drive voltage for the conventional waveguide-type optical device of FIG. 12.

For reference, an illustrative state of variations of the electric field intensity $E(x)$ is shown in FIG. 11, in which the electric field intensity $E(x)$ is plotted along the axis of ordinates and $x/L$ is plotted along the axis of abscissas and the results calculated based on the above-described formulas (6) and (9) are diagrammatically depicted. In the example of FIG. 11, variations of $E(x)$ when $l/L$ was set at 0.03 and K was set at 1, 0.1, 0.01 and 0.001, respectively, are indicated by curves ①, ②, ③ and ④. In the diagram, the dashed line indicates the intensity $E(x) = V_o/L$ of an electric field developed solely via the electrodes. As is envisaged from these curves ①-④ and the dashed line, the superimposed electric fields of the electric fields produced by carriers injected, for example, at K=0.01 and 0.001, respectively, and the electric field developed via the electrodes are similar to the electric field developed solely via the electrodes. As a result, it is possible to practically eliminate variations of the drive voltage.

It is to be noted that the present invention is not limited to the embodiments described above and the shape, dimensions, position, structure, formation, material and other conditions of each element can therefore be modified suitably as desired.

For example, the carrier capture layer can be provided for only the electrode through which electrons are injected as carriers, for only the electrode through which holes are injected as carriers, or for both the electrodes through which electrons and holes are injected, respectively.

On the other hand, Si, ZnO or Cr-SiO cermet or any other desired suitable material can be used to form the semiconducting film. Unduly low resistance of the semiconducting film allows a large current to flow across the electrodes of the device so that the device may be broken or the device cannot be controlled in a desired operation state. It is therefore desirable to form a semiconducting film having a resistance free from occurrence of such inconvenience, for example, 10MΩ-100MΩ.

As is apparent from the foregoing description, in a waveguide-type optical carrier according to this invention, a carrier capture layer is provided in a region into which carriers are injected from at least one of electrodes, so that the carriers are captured or trapped by the carrier capture layer. The degree of superposition of an electric field, which is produced by the carriers so captured, on an electric field to be developed for operational control can be reduced, for example, by adjusting the thickness of the carrier capture layer or the density of traps therein. This makes it possible to minimize variations of the drive voltage.

What is claimed is:

1. A waveguide-type optical device comprising:
    a dielectric substrate;
    wave-guiding paths formed in the dielectric substrate;
    electrodes for forming an operation-controlling electric field for said paths;
    a buffer layer located on the substrate;
    a carrier capture layer having traps provided in a region into which carriers are injected from at least one of the electrodes, the carrier capture layer being provided on the whole surface of the buffer layer;
    a semiconductor layer located over the entire surface of the carrier capture layer;
    said electrodes being located on the semiconducting layer.

2. The device of claim 1, wherein, as viewed in plan, the electrodes and the wave-conducting paths are arranged alternately.

3. A waveguide-type optical device equipped with a dielectric substrate, wave-guiding paths formed in the dielectric substrate, and electrodes for forming an operation-controlling electric field for the wave-guiding paths, characterized in that a carrier capture layer is provided in a region into which carriers are injected from at least one of the electrodes; and further comprising:

a buffer layer provided between the substrate and the electrodes and having the carrier capture layer therein, wherein the buffer layer is divided into at least two adjacent buffer layer portions at an interval therebetween and one of the wave-guiding paths is exposed in the interval.

4. The device of claim 3, wherein the buffer layer portions are wholly formed as carrier capture layers, respectively.

5. The device of claim 3 further comprising a semiconducting film located between the buffer layer and the electrodes.

6. The device of claim 5, wherein the carrier capture layer extends continuously from the semiconducting film to the wave-guiding path, whereby the carrier capture layer is in contact with the wave-guiding path.

7. The device of claim 3 wherein the buffer layer and carrier capture layer are respectively divided into first, second and third portions defining the one interval and another interval, wherein said electrodes include first, second and third electrodes respectively located over said first, second and third portions of the carrier capture layer, and wherein another one of the wave-guiding paths is exposed in said another interval.

8. A waveguide-type optical device comprising:
a dielectric substrate;
wave-guiding paths formed in the substrate;
electrodes for forming an electric field for the wave-guiding paths,
means for superposing a further electric field on said electric field for reducing variations of a drive voltage applied to the electrodes.

9. The device of claim 8 wherein said means for superposing includes one or more carrier capture regions or layers.

10. The device of claim 9 wherein said means for superposing includes carriers collected in said carrier capture regions or layer during operation of the device.

11. The device of claim 9 wherein said carrier capture region or layer is located between one of said electrodes and one of said wave-guiding paths.

12. The device of claim 11 further including a buffer layer located between said one electrode and said one path, said carrier capture region or layer being located within said buffer layer.

13. The device of claim 12 further comprising a semiconductive film between said carrier capture regions or layer and said one electrode.

14. The device of claim 11 wherein said carrier capture regions or layer is in contact with said one path, and wherein the device further comprises a buffer region.

15. The device of claim 9 further comprising a semiconductive film between said carrier capture regions or layer and said one electrode.

16. The device of claim 9 wherein said electrodes comprise first, second and third electrodes located above said carrier capture regions or layer.

17. The device of claim 16 further including one aperture between said first and second electrodes and another aperture between said second and third electrodes, said apertures exposing at least one of the wave-guiding paths.

18. The device of claim 17 further comprising a semiconductive film or layer between said electrodes and said substrate.

19. The device of claim 16 further comprising a semiconductive film or layer between said electrodes and said substrate.

20. The device of claim 8 wherein said means for superposing comprises a substantially planar carrier capture layer interposed between said electrodes and said paths.

21. The device of claim 20 further comprising a buffer layer between said paths and said electrodes, and wherein said carrier capture layer is located between said buffer layer and said electrodes.

22. The device of claim 20 wherein said carrier capture layer is selected from the group which comprises an annealed silicon layer and an annealed cermet layer.

23. A method of operating a waveguide-type optical device of the type having a dielectric substrate, wave-guiding paths formed in the substrate, and electrodes for forming an operation-controlling electric field for the wave-guiding paths, including applying a voltage to said electrodes to create a first electric field and superposing a second electric field on said first electric field, said superposed field tending to reduce variations of the drive voltage.

24. The method of claim 23 wherein said step of superposing an electric field includes collecting injected carriers from the electrodes into one or more carrier capture layers.

25. The method of claim 24 wherein said superposed electric field results from an electric field caused by said carriers collected in said one or more carrier capture layers.

* * * * *